Aug. 21, 1951     L. M. GEIGER     2,565,222
CONTINUOUS PROCESS FOR THE MANUFACTURE
OF MONODISPERS COUMARONE-INDENE RESINS
Filed June 30, 1948
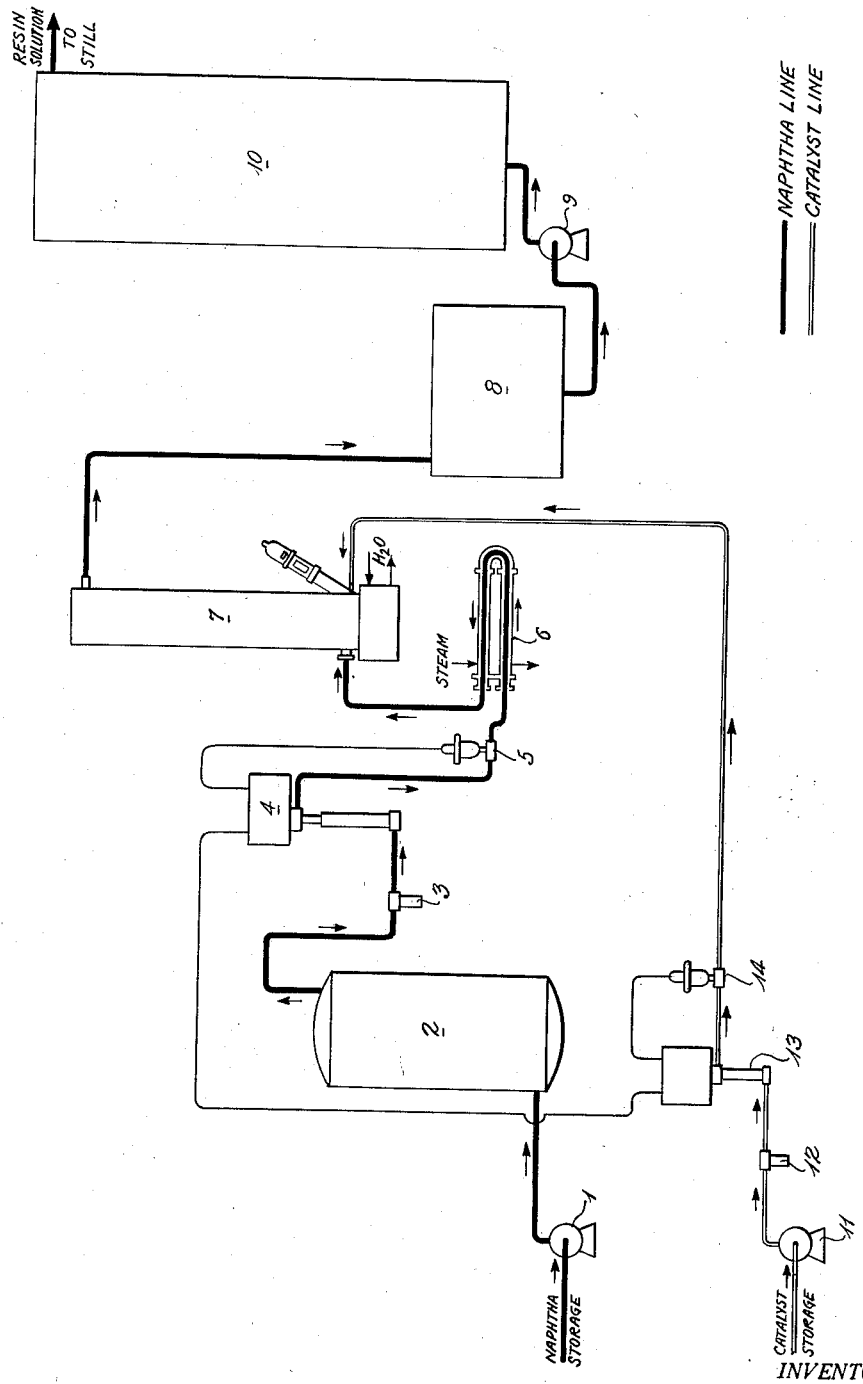
INVENTOR.
Lyle M. Geiger
BY
Burns, Doane & Benedict
ATTORNEYS Patented Aug. 21, 1951

2,565,222

UNITED STATES PATENT OFFICE 2,565,222

CONTINUOUS PROCESS FOR THE MANUFACTURE OF MONODISPERS COUMARONE-INDENE RESINS

Lyle M. Geiger, North Hollywood, Calif., assignor to The Neville Company, Neville Island, Pittsburgh, Pa., a corporation of Pennsylvania Application June 30, 1948, Serial No. 36,207

5 Claims. (Cl. 260—81)

This invention relates to a process for the production of resins from resin oils. More particularly, the invention relates to a process for the production of resins of the coumarone-indene type having substantial monodispersity and uniform physical properties by continuous polymerization of solvent naphthas containing polymerizable constituents.

These resins, known as coumarone-indene resins, are commonly produced by polymerization of the polymerizable constituents, predominantly indene, but also coumarone, styrene, methyl styrene, cyclopentadiene and a number of other polymerizables of the so-called heavy solvent naphthas; these naphthas being derived generally from crudes, such as naphtha fractions produced by coke oven operations, water-gas operations, and petroleum cracking, pyrolysis, and reforming operations.

It has been the practice to introduce polymerizing agents, such as sulfuric acid, aluminum chloride or other catalysts, into the crude heavy solvent naphtha, usually together with an inert diluent. Polymerization is generally effected at room temperatures, or at lower temperatures, after which the catalyst is removed. The resin is usually recovered by removal of the unpolymerized constituents by distillation.

Heretofore, batch processes were generally employed, although attempts have been made to develop continuous processes, whereby the naphtha is mixed intimately with the catalyst in a reaction chamber and separated later in a settling chamber, after which the catalyst is returned to the reaction chamber. Since it was found that intimate contact between the catalyst and the polymerizable unsaturates is essential, methods have been developed whereby a liquid catalyst is emulsified in the solvent naphtha to promote polymerization. Such polymerization processes, however, are heterogeneous catalytic processes.

The resins obtained in the prior art are all polydispers, that is, of non-uniform polymer size or molecular weight, since they are basically mixtures of many of the various indene polymers, such as dimers, trimers, tetramers, and on up to octamers. Dimers, such as di-indene, are usually removed by steam distillation.

While the chemical properties of these various indene polymers do not differ greatly, there is a wide variation in their physical characteristics. The solubility in various solvents is an outstanding example of a property exhibiting marked differences for the lower and the higher indene polymers. Another example is the compatibility with other high molecular weight substances, such as natural and synthetic rubber.

Solubility of a resin is one of its most important characteristics and for many practical purposes solubility or substantial insolubility of a resin in a specific solvent is required. As stated above, the resins of the prior art, produced by both batch and continuous processes, comprise a number of polymers of varying molecular sizes. Therefore, they exhibit an undesirable non-uniformity in solubility in various solvents due to their heterogeneous nature. Thus, for instance, where complete solubility in petroleum solvents at room temperatures is required, the presence of a small percentage of the indene octamer or of the hexamer in a non-uniform resin makes it impossible to fulfill such requirements, due to the insolubility of the latter polymers in the solvent. For example, while 98 percent of the resin may pass the test, the presence of only two percent of the higher polymers in a non-uniform resin may make it impossible to satisfy the specifications.

It has been attempted in prior processes to obtain resins having certain specific softening points. However, the softening point of such resins cannot be used as the sole criterion for production of products exhibiting uniform physical properties, such as solubility. For instance, resins having a definite softening point may be composites of lower and higher polymers, for example, predominantly the trimer and hexamer. Such resins, although possessing a definite softening point, would be unsuitable for many practical applications in regard to their non-uniform solubility due to the existence of different polymers of widely divergent size or molecular weight.

In order to obtain resins which exhibit the desired uniformity in physical properties, it is imperative that the degree of polymerization in any given reaction be controlled to insure the production of a resin which is substantially monodispers, that is, of uniform polymer size or molecular weight. A resin may be considered substantially monodispers or of uniform polymer size, if it consists of a single polymer, or a mixture of polymers whose sizes or molecular weights are very closely related. For example, a resin consisting solely of the hexamer, or composed of the hexamer mixed with varying amounts of the pentamer or heptamer may be considered substantially monodispers. The physical properties of such monodispers resins are characterized by a single quantity due to their uniform composition, rather than by a wide range of quantities such as characterizes the polydispers resins of the prior art processes. This non-uniformity of the latter greatly restricts their range of application since they fail to meet rigid specifications, particularly in regard to solubility.

Attempts have been made to separate the polydispers or non-uniform polymer size resins obtained by polymerization of solvent naphthas to produce monodispers products. However, the results are unsatisfactory due to the similarity of physical characteristics of the various polymers and no procedures commercially feasible have yet been devised.

It is, therefore, a primary object and purpose of the invention to provide a process for the continuous polymerization of the polymerizables in solvent naphthas whereby the resins produced are substantially monodispers and of uniform physical characteristics.

Another object of the invention is to provide a continuous process for the production of resins of the coumarone-indene type in which the degree of polymerization of the solvent naphthas is controlled whereby the resulting resins are characterized by a selected uniform polymer size having the physical properties desired.

Still another object of the invention is to provide a continuous process for polymerizing solvent naphthas whereby the resinous product is of the desired polymer size.

A further object of the invention is to provide a continuous process for the production of resins by rapid polymerization of the polymerizables in solvent naphthas whereby the resins possess uniform solubility characteristics.

Other objects and advantages of the invention will become apparent from the following detailed description thereof.

It has been discovered according to the present invention that substantially monodispers resins, that is, resins of uniform polymer size, having improved color and exhibiting surprisingly uniform physical characteristics are formed in high yield by subjecting solvent naphthas containing polymerizables to continuous polymerization at selected controlled temperatures within the range of from about 30° C. to about 140° C. in the presence of a catalyst containing boron trifluoride. The resin may be recovered by separation of the catalysts followed by removal of the non-resinous constituents by distillation.

The process is applicable to any crude or refined liquid comprising coumarone, indene, methyl styrene, styrene, cyclopentadiene and the like unsaturates, or solvent naphthas obtained by fractional distillation of tars, such as coal tar, water-gas tar, and oil-gas tar, or obtained from coke oven distillates. The term "solvent naphtha" as used in the specification and claims includes such liquids as contain at least one or more of the polymerizable constituents abovementioned. Preferably, the solvent naphtha treated according to the process is a coal tar naphtha fraction boiling within the range from about 150° C. to about 200° C.

The crude solvent naphthas may be used unrefined, but it is advantageous to remove the tar bases by a dilute acid wash, since a lighter colored and more uniform product in higher yield is obtained. The crude solvent naphtha used is preferably dried before polymerization, advantageously with the aid of a suitable drier, such as calcium chloride.

The production of the monodispers resins of the desired polymer size having uniform physical characteristics, particularly uniform solubility and compatibility characteristics, is primarily effected by an accurate control of the selected polymerization temperature.

In general, it has been found that higher reaction or polymerization temperatures will promote the formation of polymers of lower molecular weight, and conversely lower temperatures will cause the formation of polymers of higher molecular weights. This factor of reaction temperature is dominant in the control of the degree of polymerization and, therefore, the size of the polymer formed. Thus, for example, it has been found according to the invention that at about 55° C. the polymeric resin formed from a solvent naphtha containing a major portion of polymerizables with boron trifluoride as a catalyst is the octamer, while at about 130° C. the product is composed substantially entirely of the tetramer.

Accordingly, the selected controlled temperature employed during polymerization is between about 30° C. and 140° C. Monodispers polymeric products varying predominantly from the dimer to a resin consisting substantially entirely of a polymer of nine fundamental units are obtained depending upon the particular selected temperature at which polymerization is conducted. Temperatures above 130° C. are usually not employed since a resin comprising predominantly the dimer is produced. The preferred range is from 90° C. to 130° C.

It is a primary advantage of the present invention that coumarone-indene resins of any desired polymer size or molecular weight may be obtained at the relatively high temperatures employed in the process. The prior art has consistently recognized that polymerization should be conducted at room temperatures or lower, and particularly that resins having softening points of about 100° C. or above can only be produced at such lower temperatures. Furthermore, the art teaches the use of polymerization temperatures over 100° C. results in undesirable dark-colored resins. Nevertheless, the process of the present invention produces light-colored resins having higher molecular weights, as well as the lower molecular weight resins, in high yield, although polymerization is preferably conducted at temperatures of 90° C. and above.

This factor advantageously increases plant capacity by decreasing the time necessary for completion of the polymerization reaction, it being well-known that, generally, an increase in reaction temperature of 10° C. doubles the reaction rate.

It has been further discovered that a solvent naphtha containing a large proportion, that is, over 30% polymerizables may be advantageously employed in the process. In this regard, it has been found that, generally, the higher the concentration of polymerizables in the solvent naphtha, the higher the degree of polymerization at a given reaction temperature. Thus, by the use of a relatively high concentration of polymerizables, that is, solvent naphthas containing over 30% polymerizable oils, the process of the invention may be operated at relatively high temperatures and substantially monodispers resins having softening points of about 100° C. or higher are obtained.

The use of such high concentrations of polymerizables constitutes another advantage in that the yield per unit of time and/or equipment is still further increased. Furthermore, in previous processes attempting to control the softening points of the resinous products, a low concentration of polymerizables, that is, preferably less than 30%, was considered necessary.

The range of concentration of polymerizables may widely vary from about 30% to the highest obtainable concentration. However, it is recommended, that in the production of a resin of a given desired polymer size, a relatively constant percentage of polymerizables be employed. The concentration of polymerizables in the resin oils used as starting materials may conveniently be adjusted by mixing richer crudes with poorer crudes or with saturates from the naphtha. A preferred range of percentage polymerizables is from about 55% to about 70%.

The catalysts utilized in the process are boron trifluoride containing compounds, particularly those which are soluble in the solvent naphthas, whereby the reaction is of the homogeneous liquid phase catalytic type. The preferred catalysts are selected from the group consisting of boron trifluoride, its organic complexes, such as, those formed with ethers, alcohols, organic acids, and phenols, mixtures of one or more of such complexes, and mixtures of boron trifluoride and one or more of such complexes. A particularly useful catalyst is the boron trifluoride diethyl ether complex.

Among the many boron trifluoride organic complexes suitable for the process there may be mentioned by way of illustration, the BF$_3$ complexes with organic acids, such as boro-fluoro-fatty acids, for example, boro-fluoro-acetic acid, -formic acid, -propionic acid; boro-fluoro-ethers, such as boro-fluoro-diethyl ether, diisopropyl ether, -methyl ethyl, -butyl ethyl and other aliphatic ethers, as well as aromatic ethers, for example, ethyl phenyl ether; boro-fluoro-alcohols, such as, boro-fluoro isopropyl alcohol, -ethyl alcohol, -n-amyl alcohol, -isobutyl alcohol and the like; and boro-fluoro-phenols, such as boro fluoro phenol, -toluols, -xylols, and -dihydroxyphenols, for example, -resorcinol. All of the BF$_3$ organic complexes are liquids or solids soluble in the solvent naphthas, and when BF$_3$ alone is employed, it is, of course, a gas which exhibits suitable solubility in the naphthas to produce a homogeneous liquid phase system for the catalytic reaction.

The concentration or amount of catalyst may be widely varied without unduly affecting the results of the process. Usually between about 0.5% and about 2.5% catalyst by weight of polymerizables is employed. Lower concentrations than 0.5% by weight produce satisfactory results, but fail to complete polymerization, therefore, lowering the yield. An excess of catalyst over 2.5% merely increases the reaction rate slightly, but is not otherwise useful, and is, therefore, avoided in the interest of economy. An extremely high catalyst concentration may be used in order to complete the reaction in a much shorter period of time than the usual fifteen minutes, but generally such a procedure is not recommended.

As a rule, no inert solvent need be added as a diluent in this process, since the viscosity of the resin solutions at the relatively high reaction temperatures is sufficiently low to allow a proper handling of the naphtha-catalyst solution without diluent, leading to a much more economical process than those of the prior art, where losses of solvents and the expenses of their partial recovery cannot be avoided.

The continuous catalytic process operated at a temperature of about 80° C. is completed within about fifteen minutes. At higher temperatures somewhat less time is required for completion of the desired degree of polymerization. Therefore, the process generally may be conducted for about fifteen minutes to insure complete reaction. A shorter reaction time may be utilized, but results in a slight decrease in yield due to incomplete reaction. On the other hand, the reaction period may be prolonged, but serves no useful purpose since the reaction is already completed. At lower temperatures increased reaction times are needed, unless excess of catalyst is used or highly reactive crudes are present.

In conducting the continuous process, the initial charge of naphtha is preferably preheated to the desired selected polymerization temperature and is then simultaneously charged into a reaction zone with the catalyst. The amount of the latter is controlled through suitable flow control means governed by the flow of preheated naphtha. Thereafter, additional controlled amounts of cooler naphtha at a temperature appreciably below the selected polymerization temperature are continuously charged into the reaction zone.

Alternatively, the initial charge of naphtha may be preheated in the reaction zone prior to introduction of the catalyst followed by continuous addition of controlled amounts of cooler naphtha.

In any event, the reaction zone is continuously charged with controlled amounts of cooler naphtha to maintain the temperature during polymerization, so that it does not vary in any substantial degree from the selected temperature of polymerization corresponding to the temperature of the initial charge. The reaction zone is also provided with a water-cooling system to further abstract the heat of the exothermic reaction and thereby maintain the reacting mixture at the desired temperature.

The invention is more fully described with reference to the accompanying drawing which illustrates in flow diagram form a preferred embodiment of the continuous process utilizing the homogeneous liquid phase catalytic polymerization reaction.

The acid-washed heavy solvent naphtha is pumped from a storage tank (not shown) by pump 1 into calcium chloride drier 2 and passed over filter 3 into the preheater 6, at a flow controlled by flow meter controller 4 and flow control valve 5.

The initial charge of naphtha is heated in preheater 6 to the selected temperature depending on the desired degree of polymerization and is then introduced into reactor 7, which is provided with a water-cooling system to abstract the heat evolved in the exothermic reaction, thus maintaining the desired polymerization temperature. At the same time, the catalyst is pumped from a storage tank (not shown) by the catalyst pump 11 through filter 12 into the reactor 7, at a flow controlled by flow ratio controller 13 and flow control valve 14. As the reaction ensues, additional controlled amounts of cooler naphtha below the reaction temperature are continuously fed to the reactor 7, which together with the water-cooling system maintains the reacting mixture at the selected polymerization temperature.

The reacted mixture of catalyst, polymerized naphtha and non-resinous constituents flows through an overflow pipe into holding tank 8, and is pumped by pump 9 into the clay tower 10, where the catalyst is removed by adsorption. The purified resin solution is pumped to a still, not shown in the drawings, where in a continuous steam distillation process the non-resinous constituents are distilled off, while the liquefied resin is continuously withdrawn.

In order to establish a quantitative means of evaluating the uniformity of physical properties of a resin of the coumarone-indene type, the following test has been devised. It is based upon the differences in solubility of various resins or indene polymers in Stoddard naphtha.

Five (5) grams of resin are dissolved in twenty (20) grams of Stoddard naphtha at a temperature high enough to ensure solution. The solution is then placed in a 50 cc. Erlenmeyer flask, while a thermometer is placed in the center of the liquid, held in place by a stopper in which a hole has been made. The solution is then cooled slowly, about 3° C. per minute. The temperature of the appearance of the first trace of opalescence is defined as the "initial temperature of precipitation" (ITP) and is accurately recorded. The temperature is then allowed to fall very slowly, about 1° C. per minute. The opalescence will gradually increase and finally the bulk of the resin will precipitate. An arbitrary standard has been accepted, which indicates this bulk precipitation, by placing a 50 watt electric bulb directly behind the flask and recording the exact temperature at which the part of the thermometer inserted in the liquid becomes invisible to the observer positioned in front of the flask. This temperature is defined as the "definite temperature of precipitation" (DTP). A trained operator may duplicate his results for the values of the ITP and DTP within 0.2° C.

Monodispersity or uniform polymer size exists in a resin which exhibits a difference between the ITP and DTP of only 1 to 2° C., that is, where the resin exhibits a uniform solubility. The resins produced according to the process of the invention are truly monodispers and exhibit marked uniformity in physical properties, particularly in solubility, as shown by the small differences between the ITP and the DTP which are without exception 2° C. or less.

On the other hand, it was found that the coumarone-indene resins prepared by previous processes usually show differences of 10–25° C. between ITP and DTP, while only rarely differences below 10° C. exist. The following table indicates these values for coumarone-indene resins of various origins:

Table

| Resin | °C. Melting Point | Color | °C. ITP | °C. DTP | Difference, °C. (ITP-DTP) |
|---|---|---|---|---|---|
| A | 111 | 2 | 53 | 30 | 23 |
| B | 137 | 3 | 47 | 32 | 15 |
| C | 131 | 3 | 38 | 26 | 12 |
| D | 117 | 1 | 40 | 28 | 12 |
| E | 130 | 2 | 48 | 38 | 10 |
| F | 105 | 3 | 32 | 18 | 14 |
| G | 145 | ¾ | 60 | 45 | 15 |
| H | 155 | 1 | 66 | 48 | 18 |

Thus, it is obvious that these resins showing a great variation in solubility characteristics, are not monodispers, but have a wide variation in sizes of the component polymers.

The following examples are illustrative of the invention, but are not to be construed as a limitation thereof.

Example 1

In the continuous reactor shown in the flow diagram acid-washed and dried heavy solvent naphtha is introduced, containing 68.4% polymerizables together with 1.2 percent of the polymerizables by weight of a boron trifluoride-ethyl ether complex catalyst containing 47% BF$_3$. The mixture is passed through the reactor at 90° C. in a period of 15 minutes. A resin is obtained of a melting point of 177° C., ITP 82° C., DTP 80.5° C., yield 51%, of a color ½.

Example 2

In the continuous reactor acid-washed and dried heavy solvent naphtha is introduced, containing 68.4 percent of polymerizables, together with 1.2 percent by weight of a boron-trifluoride-ethyl ether catalyst containing 47% BF$_3$. The mixture is passed through the reactor at 96° C. in a period of 15 minutes. A resin is obtained of a melting point of 152.5° C., ITP 63° C., DTP 62° C., color ¾, yield 51.3%.

Example 3

In the continuous reactor acid-washed and dried heavy solvent naphtha is introduced containing 68.4% polymerizables, together with 1.2% by weight of a boron trifluoride-ethyl ether complex catalyst containing 47% BF$_3$. The mixture is passed through the reactor at 110° C. in a period of 15 minutes. A resin is obtained of a melting point of 126° C., ITP 37.5° C., DTP 36° C., color ¾, in a 51.0% yield.

Example 4

In the continuous reactor acid-washed and dried heavy solvent naphtha containing 60% polymerizables is introduced, together with 1.2% by weight of a boron trifluoride-ethyl ether complex catalyst containing 47% BF$_3$. The mixture is passed through the reactor at 110° C. in a period of 15 minutes. A resin is obtained of a melting point of 132° C., ITP 32.5° C., DTP 32° C., color 1, in a 50.1% yield.

Example 5

In the continuous reactor acid-washed and dried heavy solvent naphtha containing 68.4% polymerizables is introduced together with 1.2% by weight of a boron trifluoride-ethyl ether catalyst containing 47% BF$_3$. The mixture is passed through the reactor at 120° C. in a period of 15 minutes. A resin is obtained of a melting point of 114° C., ITP 21° C., DTP 19.5° C., color 2, yield 51.0%.

Example 6

In the continuous reactor acid-washed and dried heavy solvent naphtha containing 68.4% polymerizables is introduced, together with 1.2% by weight of a boron trifluoride-ethyl ether catalyst containing 47% BF$_3$. The mixture is passed through the reactor at 130° C. in a period of 15 minutes. A resin is obtained of a melting point of 96° C., ITP 7° C., DTP 5.5° C., of a color 2, in a yield of 49.0%.

Example 7

In the continuous reactor acid-washed and dried heavy solvent naphtha containing 60% polymerizables is introduced together with 2.5% by weight of a boron trifluoride-phenol catalyst containing 45% BF$_3$. The mixture is passed through the reactor at 110° C. in a period of 15 minutes. A resin is obtained of a melting point of 133° C., ITP 120° C., DTP 118° C., of color 3, in a yield of 25%.

Example 8

In the continuous reactor acid-washed and dried heavy solvent naphtha containing 60% polymerizables is introduced, together with 1% of a boron trifluoride-acetic acid catalyst containing 53% $BF_3$. The mixture is passed through the reactor at 130° C. in a period of 15 minutes. A resin is obtained of a melting point of 102° C., ITP 39° C., DTP 37.5° C., color 1, in a yield of 52.2%.

Example 9

In the continuous reactor acid-washed and dried heavy solvent naphtha containing 60% polymerizables is introduced together with 1% of a gaseous boron trifluoride catalyst. The mixture is passed through the reactor at 120° C. in a period of 15 minutes. A resin is obtained of a melting point of 115° C., ITP 28° C., DTP 27° C., of a color 1, in a yield of 51%.

Example 10

In the continuous reactor acid-washed and dried heavy solvent naphtha containing 60% polymerizables is introduced, together with 3% of a boron trifluoride-isopropyl alcohol complex catalyst containing 30% $BF_3$. The mixture is passed through the reactor at 130° C. in a period of 15 minutes. A resin is obtained of a melting point of 104° C., ITP 33° C., DTP 32° C., of a color 1½, in a yield of 50.3%.

Example 11

In the continuous reactor crude heavy solvent naphtha is introduced containing 60% polymerizables, together with 1.2% by weight of a boron trifluoride-ethyl ether complex catalyst containing 47% $BF_3$. The mixture is passed through the reactor at 110° F. in a period of 15 minutes. A resin is obtained of a melting point of 126° C., ITP 34° C., DTP 32° C., color 3, in a 46% yield.

The color of the resins as indicated in the table and in the foregoing examples is the customary resin color scale, which scale is made by mixing three stock solutions in the proportions indicated in the following table, thereby obtaining the colors indicated in this table; namely, stock solution "A" constituted of 40 cc. of 33.5% hydrochloric acid and 1560 cc. of water; stock solution "B" made by triturating 450 grams of C. P. ferric chloride ($FeCl_3.6H_2O$), 270 cc. of solution "A" and filtering, using the clear filtrate for stock solution "B"; and stock solution "C" made by triturating 60 grams of C. P. cobalt chloride ($CoCl_2.6H_2O$) and 60 cc. of solution "A" and filtering, using the filtrate for stock solution "C."

[Volumes in cubic centimeters.]

| Color Number | A | B | C | Water | Standard C Series |
|---|---|---|---|---|---|
| C-1/16 | 21 | | | | 3 of #½. |
| C-1/8 | 18 | | | | 6 of #½. |
| C-1/4 | 12 | | | | 12 of #½. |
| C-3/8 | 6 | | | | 18 of #½. |
| C-1/2 | 125 | 0.5 | 0.50 | | |
| C-3/4 | | | | | 12 of #½ plus 12 of #1. |
| C-1 | 125 | 1.0 | 0.75 | | |
| C-1¼ | | | | | 12 of #1 plus 12 of #1½. |
| C-1½ | 125 | 1.4 | 0.95 | | |
| C-2 | 125 | 2.0 | 1.25 | | |
| C-2½ | 125 | 2.8 | 1.60 | | |
| C-3 | 125 | 4.0 | 2.00 | | |
| C-3½ | 15 | 6.0 | 2.00 | 110 | |
| C-4 | 15 | 8.0 | 2.00 | 110 | |

The solutions should be mixed well and about 25–28 cc. of each of the above-indicated mixtures placed in a 1 oz. test bottle, each bottle labeled with its number, and the bottle sealed with sealing wax to prevent evaporation of water and HCl.

To determine the color of a resin, a 2-gram sample thereof is dissolved in 25 cc. of benzol and the depth of the color of the resin solution thus produced is compared with the standard colors. If the sample lies between two consecutive numbers, its color is reported as the higher one.

From the foregoing examples it is apparent that the resins obtained are not only formed in a good yield, having a light color and at any desired softening point within the usual commercially desirable range, but also of a very unusual uniformity and monodispersity, as may be seen from the differences of 2° C. or less in the initial and definite temperatures of precipitation determined according to the previously described test, as compared with the usual differences of 10–25° C. found in the coumarone-indene resins of the prior art, examples of which were given in the table.

Having thus described my invention, what I claim is:

1. A process for the production of resins having uniform polymer size and exhibiting uniform physical properties which comprises continuously preheating a solvent naphtha containing from 55 to 70% polymerizables to a selected substantially uniform polymerization temperature of from 90° to 130° C., continuously feeding the preheated naphtha to a reaction zone, continuously feeding about 0.5 to 2.5% by weight of polymerizables of a boron trifluoride containing catalyst to the reaction zone to produce a homogeneous liquid phase reaction medium and to cause continuous polymerization of the polymerizables in the naphtha, continuously feeding additional amounts of naphtha at a lower temperature than the selected polymerization temperature to the reaction zone, continuously withdrawing the reaction mixture from the reaction zone, separating the boron trifluoride containing catalyst from the polymerized reaction product dissolved in unpolymerized constituents of the naphtha by adsorption of the catalyst, and recovering the resin from the solution by steam distillation of the unpolymerized constituents.

2. A process for the production of resins having uniform polymer size and exhibiting uniform physical properties which comprises preheating a solvent naphtha containing from 30% to 70% polymerizables to a selected substantially uniform polymerization temperature of from 55° C. to 140° C., continuously feeding the preheated naphtha to a reaction zone, continuously feeding about 0.5 to 3% by weight of polymerizables of a boron trifluoride containing catalyst to the reaction zone to produce a homogeneous liquid phase reaction medium and cause continuous polymerization of the polymerizables in the naphtha, continuously feeding additional amounts of naphtha at a lower temperature than the selected polymerization temperature to the reaction zone, continuously withdrawing reaction mixture from the reaction zone, and recovering the resin from the reaction mixture.

3. The process of claim 2, in which the catalyst is a boron trifluoride-diethylether complex catalyst.

4. The process of claim 2, in which the catalyst consists of gaseous boron trifluoride.

5. A process for the production of resins having uniform polymer size and exhibiting uniform physical properties which comprises preheating a solvent naphtha containing from 30% to 70% polymerizables to a selected substantially uniform polymerization temperature of from 55° C. to 140° C., continuously combining in a reaction zone the preheated naphtha and about 0.5 to 3% by weight of polymerizables of a boron trifluoride containing catalyst to produce a homogeneous liquid phase reaction medium and cause continuous polymerization of the polymerizables in the naphtha, continuously feeding additional amounts of naphtha at a lower temperature than the selected polymerization temperature to the reaction zone, continuously withdrawing reaction mixture from the reaction zone, and recovering the resin from the reaction mixture.

LYLE M. GEIGER.

REFERENCES CITED

The following references are of record in the file of this patent:

UNITED STATES PATENTS

| Number | Name | Date |
|---|---|---|
| 2,283,236 | Soday | May 19, 1942 |
| 2,387,626 | Ward | Oct. 23, 1945 |
| 2,413,893 | Soday | Jan. 7, 1947 |
| 2,448,127 | Stanley | Aug. 21, 1948 |
| 2,459,109 | McKay | Jan. 11, 1949 |

OTHER REFERENCES

D'Alelio: "A Laboratory Manual of Plastics and Synthetic Resins," page 54, Wiley (1943).

Schmidt et al.: "Principles of High-Polymer Theory and Practice," pages 128–129, McGraw-Hill (1948).